J. A. McKEE.
CONCRETE COLUMN.
APPLICATION FILED DEC. 7, 1908.
986,733.
Patented Mar. 14, 1911.
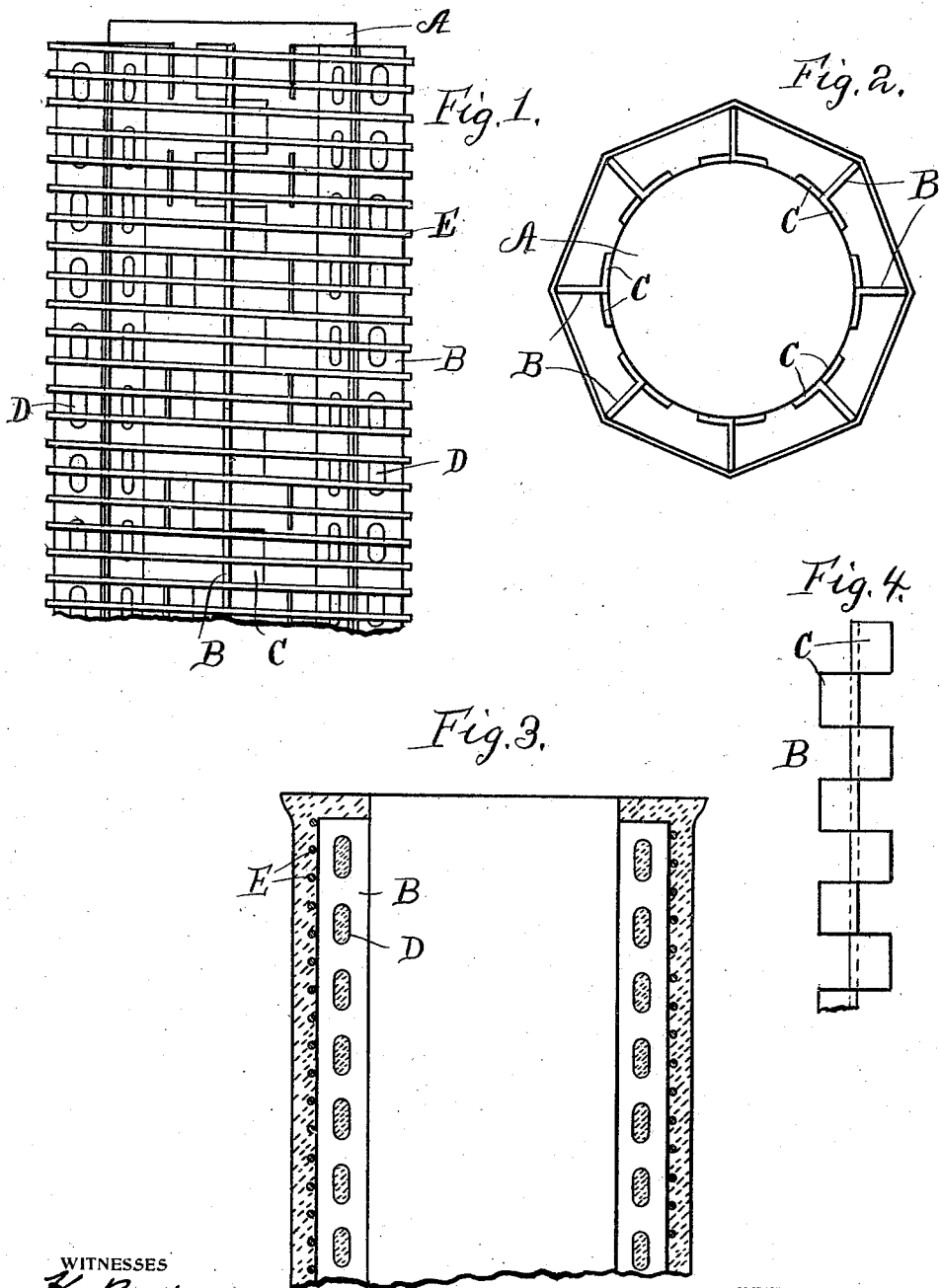

UNITED STATES PATENT OFFICE.

JOHN A. McKEE, OF PHILADELPHIA, PENNSYLVANIA.

CONCRETE COLUMN.

986,733.  Specification of Letters Patent.  Patented Mar. 14, 1911.

Application filed December 7, 1908. Serial No. 466,219.

*To all whom it may concern:*

Be it known that I, JOHN A. MCKEE, a citizen of the United States, residing at Philadelphia, in the county of Philadelphia, State of Pennsylvania, have invented a certain new and useful Improvement in Concrete Columns, of which the following is a specification.

My invention relates to a new and useful improvement in concrete columns, and has for its object to so construct such a column that it will be comparatively light in weight and thoroughly braced and stayed so as to resist sidewise strains.

With these ends in view, this invention consists in the details of construction and combination of elements hereinafter set forth and then specifically designated by the claim.

In order that those skilled in the art to which this invention appertains may understand how to make and use the same, I will describe its construction in detail, referring by letter to the accompanying drawing forming a part of this specification, in which—

Figure 1 represents a core having the stays and brace wires placed thereon preparatory to casting or molding a column. Fig. 2, an end view thereof, and Fig. 3, a central vertical section of a portion of a column molded over these stays and braces. Fig. 4, a detail perspective of a portion of one the stay strips.

In carrying out my invention as here embodied, I utilize a core A for giving the interior contour of the column and upon this core I place the stay strips B in a longitudinal position, and there may be any desired number of these strips, each of which is formed from a strip of metal having the feet C cut and bent to the curvature of the core. These strips also have the openings or slots D formed therein in order that the cement when molded around the core may unite through these openings. After the stay strips have been set in place they are secured by the brace wires E being wound around their outer edges as clearly shown, and if desired these wires may have interwoven therewith cross wires so as to further strengthen the completed column. In completing the column the cement is molded around the stay strips and brace wires its outer contour being formed in any suitable manner, so that when the core is withdrawn a light and strong column will remain.

My improved column is especially adapted for use in porches, porticos and the like where it is used to displace wooden columns which are very unsatisfactory, in that they rot away at their points of contact with the floor and ceiling, especially the former, whereas my improved column will last indefinitely for this class of work, and if it is desired this column when set in place may be filled with rough cement or concrete and used for a supporting column, as it would then have great sustaining power and on account of the brace wires the cement may be packed or rammed within the column, as these wires would prevent the expansion or bursting of the column. In practice, I have found that these columns may be made sufficiently strong when the walls thereof do not exceed three-eighths of an inch in thickness, thus making the column of light weight and at small cost.

Of course I do not wish to be limited to the exact details here shown as for instance.

Having thus fully described my invention, what I claim as new and useful, is—

A concrete column comprising vertical reinforcing metal stays radially disposed, flaps formed integrally on said stays and bent alternately in opposite directions to form concentric bases for said stays, a circumferential wire wrapping for surrounding and engaging said stays, said stays having holes formed therein and cement interfitting in the structure.

In testimony whereof, I have hereunto affixed my signature in the presence of two subscribing witnesses.

JOHN A. McKEE.

Witnesses:
EDW. W. ANSTICE,
S. M. GALLAGHER.

---

Copies of this patent may be obtained for five cents each, by addressing the "Commissioner of Patents, Washington, D. C."